July 10, 1934.  S. WISE  1,965,680
SPARE TIRE LOCK
Filed Dec. 19, 1930
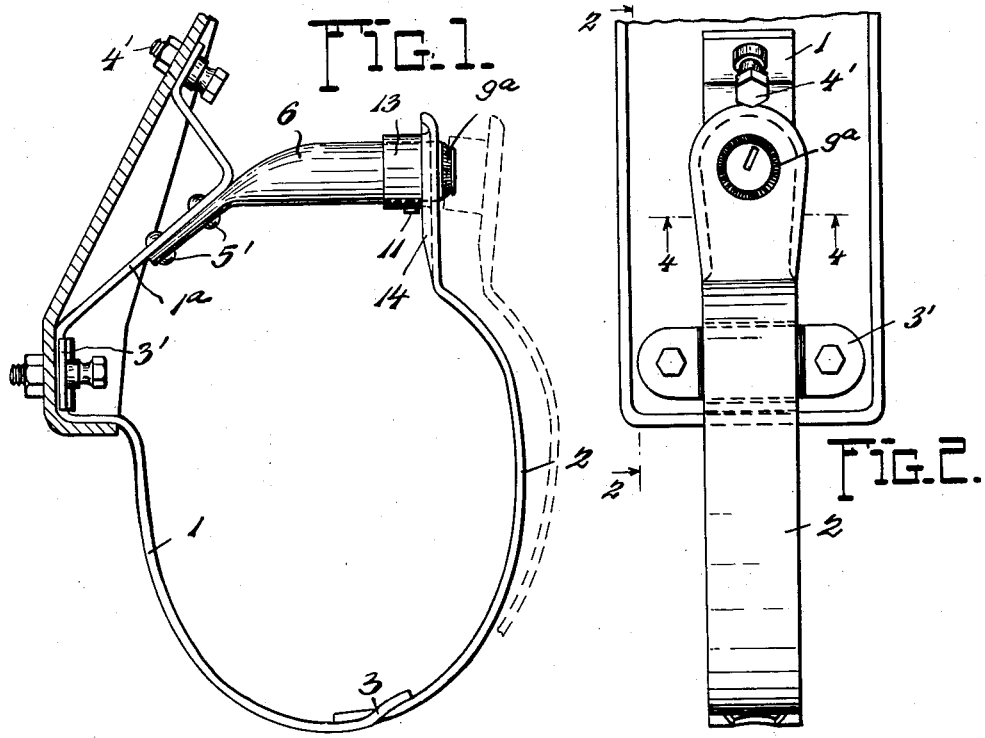
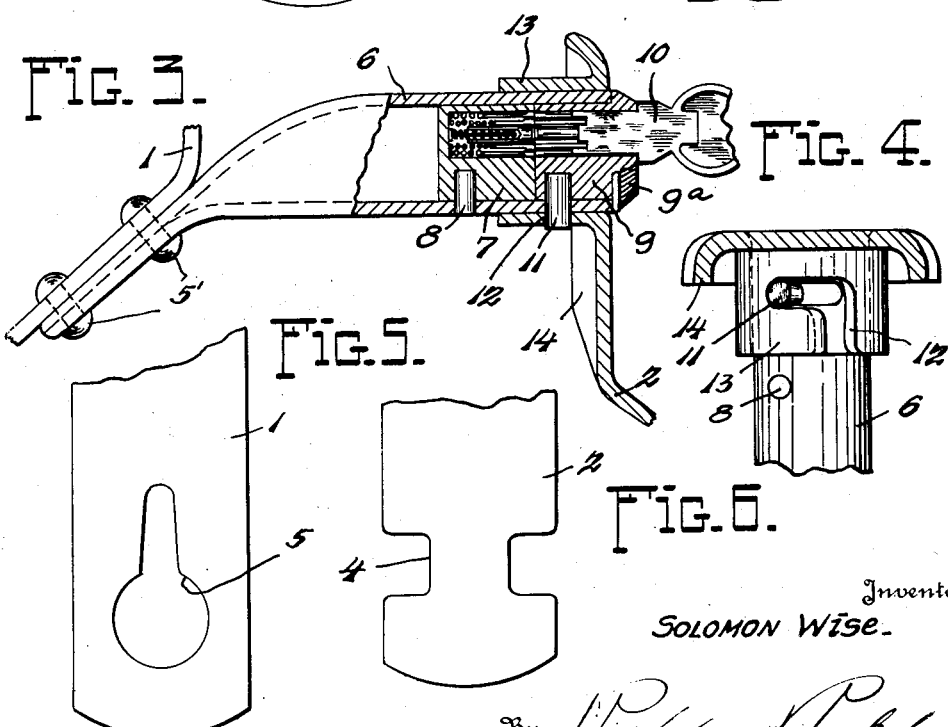
Inventor
SOLOMON WISE Patented July 10, 1934

1,965,680

UNITED STATES PATENT OFFICE 1,965,680

SPARE TIRE LOCK

Solomon Wise, Shaker Heights, Ohio

Application December 19, 1930, Serial No. 503,548

9 Claims. (Cl. 70—90)

This invention proposes a novel design of automobile lock of the so-called band-lock type at present extensively in use for locking spare tires and wheels on the rear of a car. Such locks primarily comprise two band sections usually, one of which sections is permanently affixed to the rear structure of the car, the other interlocked at its lower portion therewith, and displaceable relative thereto to open the band, so to speak, in order to detach the "spare", and lock mechanism heretofore carried by the movable band section or member and capable of locking or uniting the two sections at their upper portions.

Now locks such as described, have heretofore not been thiefproof to any high degree, and possess other disadvantages.

Where the band sections are locked together a connecting bar, rigid on the inner fixed section, is employed, its outer end being adapted to be locked with a lock mechanism forming a unit at the top of the movable band section, and carried by the latter. This bar is a source of weakness as it has been difficult to fasten it rigidly on the fixed band section so that thieves cannot loosen and break it from its anchorage. I have found also that when the lock mechanism is carried by the movable band section, at times the latter is dropped in mud or water, when tire or wheel replacing is being attended to, and obviously, damage to and difficulty with the lock are resultant effects. The movable band section is usually detachable entirely from the fixed one.

Again, when the lock is mounted on the top of the outer or movable band section, it is very accessible to the thief who with a hammer may ofttimes destroy the lock in short order because it is exposed and protuberant.

My objects in my present invention include the remedying of the difficulties experienced in the past by reason of the inadequacies of construction above noted, and eradicating other insufficiencies of devices used heretofore for the purposes of my invention. The construction which I provide to the desired end will be described in detail.

I wish it to be understood, however, that my band lock may be employed irrespective of whether one section is fixed to the car or not. In other words, it may be made to work on the "hand-cuff" principle, when it will be wholly detachable or free from the tire, rim and a tire carrier with which it may engage, and found on many cars in use today. Under such conditions, my band lock coacts with said parts by merely passing through the tire carrier and tire, rim, and ring bracket, and thus looping about them to lock them together.

In carrying out my invention, I briefly refer to my construction as involving the following important features.

An inner band section is employed (adapted as usual to interlock with the outer section at its lower end) equipped at its upper end with a rigidly riveted tube or casing for the lock mechanism, instead of the more or less rigid connecting bar that has been used in the past. The said tube or casing is flattened at one end and riveted to the inner band section as stated, affording a substantially unbreakable connection, and the tube is both a connecting hollow bar element and a casing for the lock instrumentalities. Hammering on the tube is difficult and ineffective to assist thievery because it is not accessible, and moreover, is just above the "spare" felly or rim which braces it thoroughly.

Another feature is that the outer band section is formed with a flanged edge reinforcement at the opening that receives the lock tube or casing, and also formed around the opening with an inwardly projecting cup or thimble that receives and surrounds with reinforcing effect, the outer end of the lock casing or tube that constitutes the upper connecting bar, or connecting structure. The lock mechanism is unique in that it is almost entirely housed by the tube, being a special type of concentric tube lock, the only exposed part of which is the outer end of an outer key barrel projecting, slightly only, beyond the upper outer face of the outer band section. This slight projecting portion of the key barrel with its knurled extremity is just sufficient to permit manipulation, but affords little in the way of a projection that could be damaged by being hit by a sledge, or other tool, with felonious intent.

Again, the structure above proposed is very compact as to the assemblage of the locking parts and locked portions of the band sections makes for great strength and efficient action of the parts, all of which, with many other advantages will be noted on reference to the following detailed description, in conjunction with the drawing, in the latter of which:—

Figure 1 is a side elevational view showing an automobile band lock embodying the invention.

Figure 2 is a view looking toward the front of the lock device at a right angle to the view of Figure 1.

Figure 3 is a fragmentary sectional view of the upper portion of the lock device, the tubular cross bar structure being shown in section to illustrate the interior locking instrumentalities, and the key being shown in place as when used to unlock the outer section of the band for release of the spare tire or wheel.

Figure 4 is a detail horizontal sectional view of the upper portion of the outer band section to illustrate the bayonet slot with which the lock pin of the key barrel engages.

Figures 5 and 6 are views of the lower ends of the inner and outer band sections illustrating the notched formation of one and the keyhole opening in the other, by which they are interlocked when one is inserted in the other, all as more fully illustrated at the bottom of Figure 1.

Referring particularly to Figure 1, it will be seen that my band lock device comprises the inner section 1 and the outer section 2, the lower ends of said sections being interlocked as at 3 by providing on the lower end of one the notched formation 4 and on the lower end of the other, the keyhole opening 5, such structure being well known in the art, and not a part of my invention. I use the terms "inner" and "outer sections" characterizing the members 1 and 2 in a purely relative sense and because the band lock is susceptible of use as a sort of "hand-cuff" lock irrespective of whether a particular section is on the inner side of the tire or wheel, or the outer side. However, the inner section 1 is mounted on the rear structure of the automobile in the well known manner as by clamp plate 3' and suitable bolts 4' at the upper portion thereof.

While discussing the form of the body of the band lock, I may also remark that said body instead of being composed of two sections 1 and 2, might be made in a continuous section of spring band formation, so as to permit separation of the ends, under which conditions, the term "sections" as used herein, will be regarded as meaning "portions" to develop merely the relative arrangement of the inner and outer parts of the body of the band.

The inner section 1 of the band has an angularly and upwardly bent portion 1a to which is attached by rivets or like fastenings 5', a crossbar structure designed to span the space intermediate the ends of the band which are adapted to be separated for the obvious purpose shown. This cross-bar structure includes a tube or casing 6, one end of which is flattened for the purpose of facilitating attachment thereof by the rivets 5' to the inner band section, the other end portion of said tube or casing being adapted to contain the locking mechanism used for locking the separable ends of the band together.

Now this locking mechanism may take a number of different forms, of course, but I prefer to employ, in a general way, a type of concentric tube mechanism such as shown by my United States Letters Patent No. 1,390,222 granted September 6th, 1921, and No. 1,741,390, granted December 31st, 1929, these patents being referred to as merely typical constructions.

The said lock mechanism comprises an inner barrel 7 held permanently attached to the casing or tube 6 by an assembly pin 8, and an outer barrel which is called the key barrel designated 9, and into which is introduced the key 10 for the purpose of unlocking the mechanism.

The key barrel 9 is equipped with a lock pin 11 which performs two functions. In the first place, this lock pin secures the key barrel to the tube or casing 6 and holds the said barrel in its operative position permanently assembled in relation to the part 6, and also holding certain concentric tubes, springs, etc., of the locking mechanism in proper place, allowing, however, limited rotative movement of the barrel.

In the second place, the lock pin 11, which passes through the lower portion of the tube 6 to establish the interlocking connection therewith, also interengages with a bayonet slot 12 in the thimble or round flange or tubular extension 13, which is projected inwardly from the upper end of the outer section 2 of the band. This upper end portion on the section 2 is provided with incurved reinforcing and finishing flanges 14, as seen best in the drawing, and the thimble or member 13 provides a long reinforcing element extending longitudinally of the tube 6 to reinforce and protect the same and afford a broad bearing on the tube for the upper end of the member 2. The opening in the lower side of the tube 6 through which the lock pin 11 passes is transversely elongated so that the key barrel 9 may be turned sufficiently to bring the pin 11 opposite the open portion of the bayonet slot 12 in the unlocked position.

I deem it to be unnecessary to describe specifically all details of the locking devices carried by the inner barrel 7 and the key barrel 9 since these are practically identical with corresponding devices employed in the lock mechanisms of the patents previously mentioned.

I merely state that I employ for each of said barrels, a series of matching concentric cylinders, the cylinders in the rear barrel being spring-pressed outwards, and the cylinders in the outer barrel or key barrel 9 being capable of being moved into alignment and out of alignment with the cylinders of the barrel 7. The cylinders in the key barrel 9 are prevented from displacement by the outer closed end 9a of the key barrel which end is knurled so that it may be readily turned by the fingers to re-lock the mechanism after it has been unlocked, without using the key.

With the above description of the construction of my device, an understanding of its operation is very easily had. The act of unlocking the outer portion 2 of the band is performed by turning of the key 10 after introduction of said key in order to operate the concentric tubes to bring the adjacent ends of these tubes on a line of cleavage established between the adjacent ends of the inner barrel 7 and the key barrel 9, the movement of the tubes being a key displacement action as well pointed out in my previous Letters Patent.

It is necessary, of course, that the tubes be so operated in order to unlock the barrels 7 and 9 relatively to each other to enable turning movement of the key barrel 9, whereupon the locking pin 11 will be brought to the open portion of the bayonet slot and the upper end of the section 2 may then be pulled outwards being freed from the locking action of said pin 11.

An opposite movement of the upper end of the section 2 is performed when relocking the parts together, it only being necessary, the key having been previously withdrawn, for the user to grasp the knurled portion 9a of the key barrel 9 and turn it rotatively until the locking pin 11 engages the inner closed portion of the bayonet slot and the various locking cylinders of the parts 7 and 9 are brought into alignment and caused to extend across the line of cleavage between the barrels 7 and 9 to establish their locking function.

Having thus described my invention, what I claim as new and desire to secure by Letters Patent of the United States, is:—

1. In an automobile lock of the type described, an inner band section, an outer band section, the two connected at adjoining ends, a tubular connecting bar between the other ends of the sections and forming a casing, lock mechanism disposed in said casing, the inner end of the tubular bar being flattened and fastened to the upper part of the inner band section, and the outer band section having at its upper portion an opening to receive the outer end of the tubular bar.

2. In an automobile lock of the type described, an inner band section, an outer band section, the two connected at adjoining ends, and a tubular connecting bar between the other ends of the sections and forming a casing, lock mechanism disposed in said casing, the inner end of the tubular bar fastened to the upper part of the inner band section, the outer band section having at its upper portion an opening to receive the outer end of the tubular bar, and also provided with a cup projecting inwardly from said opening concentric therewith and receiving the outer part of the tubular bar to reinforce the same.

3. In an automobile lock of the type described, an inner band section, an outer band section, the two connected at adjoining ends, and a tubular connecting bar between the other ends of the sections and forming a casing, lock mechanism disposed in said casing, the inner end of the tubular bar fastened to the upper part of the inner band section, the outer band section having at its upper portion an opening to receive the outer end of the tubular bar, and also having an inwardly bent reinforcing flange on its edges substantially encompassing the opening.

4. In an automobile lock of the type described, an inner band section, an outer band section, the two connected at adjoining ends, a tubular connecting bar between the other ends of the sections, the upper end of the outer band section having an opening to receive the outer end of the connecting bar, and parts intermediate the bar and upper portion of the outer band section to connect the two in locked relation.

5. In an automobile lock of the type described, an inner band section, an outer band section, the two connected at adjoining ends, a tubular connecting bar between the other ends of the sections and forming a casing, lock mechanism disposed in said casing, and including an outer barrel the outer end of which is exposed at the outside of the outer band section, said barrel equipped with a pin turnable to a locked position for lockingly interengaging the outer band section.

6. In an automobile lock of the type described, an inner band section, an outer band section, the two connected at adjoining ends, a tubular connecting bar between the other ends of the sections and forming a casing, lock mechanism disposed in said casing, and including an outer barrel the outer end of which is exposed at the outside of the outer band section, said barrel equipped with a pin turnable to a locked position for lockingly interengaging the outer band section, the outer band section having a cup projected inwardly therefrom and receiving therein the outer part of the tubular bar, said cup formed with a portion to establish said locking interengagement of the outer band section with the pin.

7. In an automobile lock of the type described, an inner band section, and outer band section, the two connected at adjoining ends, a tubular connecting bar between the other ends of the sections and forming a casing, lock mechanism disposed in said casing, and including an outer barrel the outer end of which is exposed at the outside of the outer band section, said barrel equipped with a pin turnable to a locked position for lockingly interengaging the outer band section, the barrel having an opening for a key, and a knurled finger piece projecting slightly out from the outer face of the outer band section, and other locking parts forming a part of the locking mechanism located within the tubular bar at the inner side of the said barrel.

8. A band lock comprising inner and outer portions separable at adjacent ends for unlocking purposes, one of the adjacent ends of the band carrying a tubular lock casing and the other end adapted to engage over said lock casing, together with lock devices inside the lock casing for engaging the end of the band cooperating with that carrying said casing.

9. A band lock comprising inner and outer portions separable at adjacent ends for unlocking purposes, one of the adjacent ends of the band carrying a tubular lock casing and the other end adapted to engage over said lock casing, together with lock devices inside the lock casing for engaging the end of the band cooperating with that carrying said casing, said lock devices including a movable member, a lock pin carried by said movable member for holding the lock mechanism in the casing and projecting from the casing to establish interlocking connection between it and the free end of the band that engages with the casing.

SOLOMON WISE.